United States Patent [19]

Overbeck et al.

[11] Patent Number: 4,610,482
[45] Date of Patent: Sep. 9, 1986

[54] VEHICLE WHEEL WITH DISC FORMING OUTER TIRE RETAINING FLANGE

[75] Inventors: Joseph C. Overbeck, East Lansing; Garth D. Lawrence, Laingsburg; John H. Golata, Lansing, all of Mich.

[73] Assignee: Motor Wheel Corporation, Lansing, Mich.

[21] Appl. No.: 709,660

[22] Filed: Mar. 7, 1985

[51] Int. Cl.$^4$ .............................................. B60B 3/02
[52] U.S. Cl. .............................. 301/63 R; 301/64 SD; 228/135; 29/159.03
[58] Field of Search ............. 301/9 DN, 63 R, 64 SD, 301/65; 228/135; 229/159 R, 159.01, 159.3

[56] References Cited

U.S. PATENT DOCUMENTS

| | | | |
|---|---|---|---|
| 1,635,490 | 7/1927 | Meldrum | 301/64 SD X |
| 2,057,565 | 10/1936 | Eksergian | 301/5 R |
| 3,506,311 | 4/1970 | Noback | 301/65 X |
| 4,317,597 | 3/1982 | Golata et al. | 301/63 R |

FOREIGN PATENT DOCUMENTS 1003182  3/1952  France ............................. 301/63 R Primary Examiner—David A. Scherbel
Attorney, Agent, or Firm—Barnes, Kisselle, Raisch, Choate, Whittemore & Hulbert

[57] ABSTRACT

An automotive passenger vehicle, full-face styled wheel construction having a sheet metal disc with an outer peripheral portion formed to provide an outboard tire bead retaining flange. The rim includes an inboard tire bead retaining flange, an inboard tire bead seat portion, a drop-center well portion and an outboard bead seat portion. The outboard edge of the rim has a radially in-turned flange portion extending circumferentially continuously around the rim edge with a radially extending abutment surface at the outboard extremity thereof. The disc outboard flange also has a radially extending rim mating surface disposed in abutment with the rim edge abutment surface. The rim edge flange has a radially inwardly sloping surface extending between the rim outboard bead seat and rim edge abutment surface which defines with the disc outboard flange a trench disposed radially inwardly of the rim outboard bead seat. The rim and disc parts are permanently joined by a circumferentially continuous weld formed in the trench. The disc has an annular array of vent holes with axially inboard offset marginal portions, the radially outermost portions thereof providing a series of circumferentially spaced surfaces collectively defining a disc ledge concentric with the wheel axis. The outboard rim edge flange has a radially inwardly facing cylindrical surface contacting said disc ledge in axially telescoped relationship therewith to thereby locate the rim on the disc and to help support the rim against radially inwardly directed service loading imposed on the rim.

16 Claims, 4 Drawing Figures

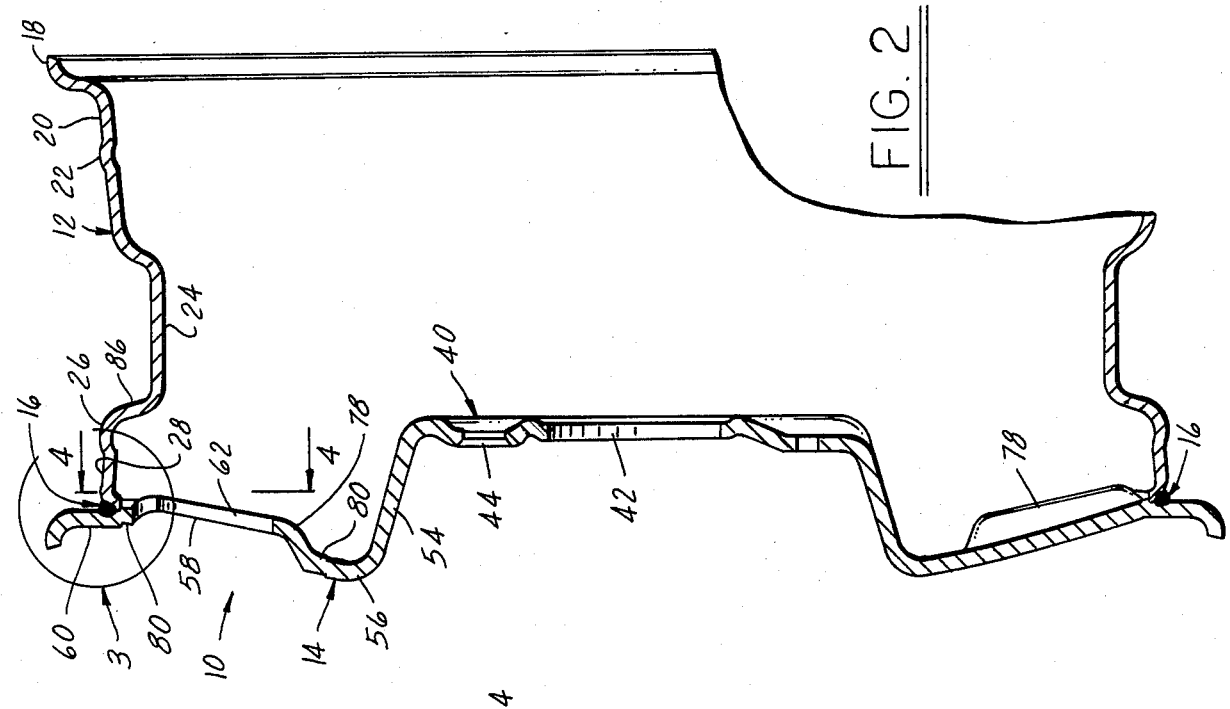
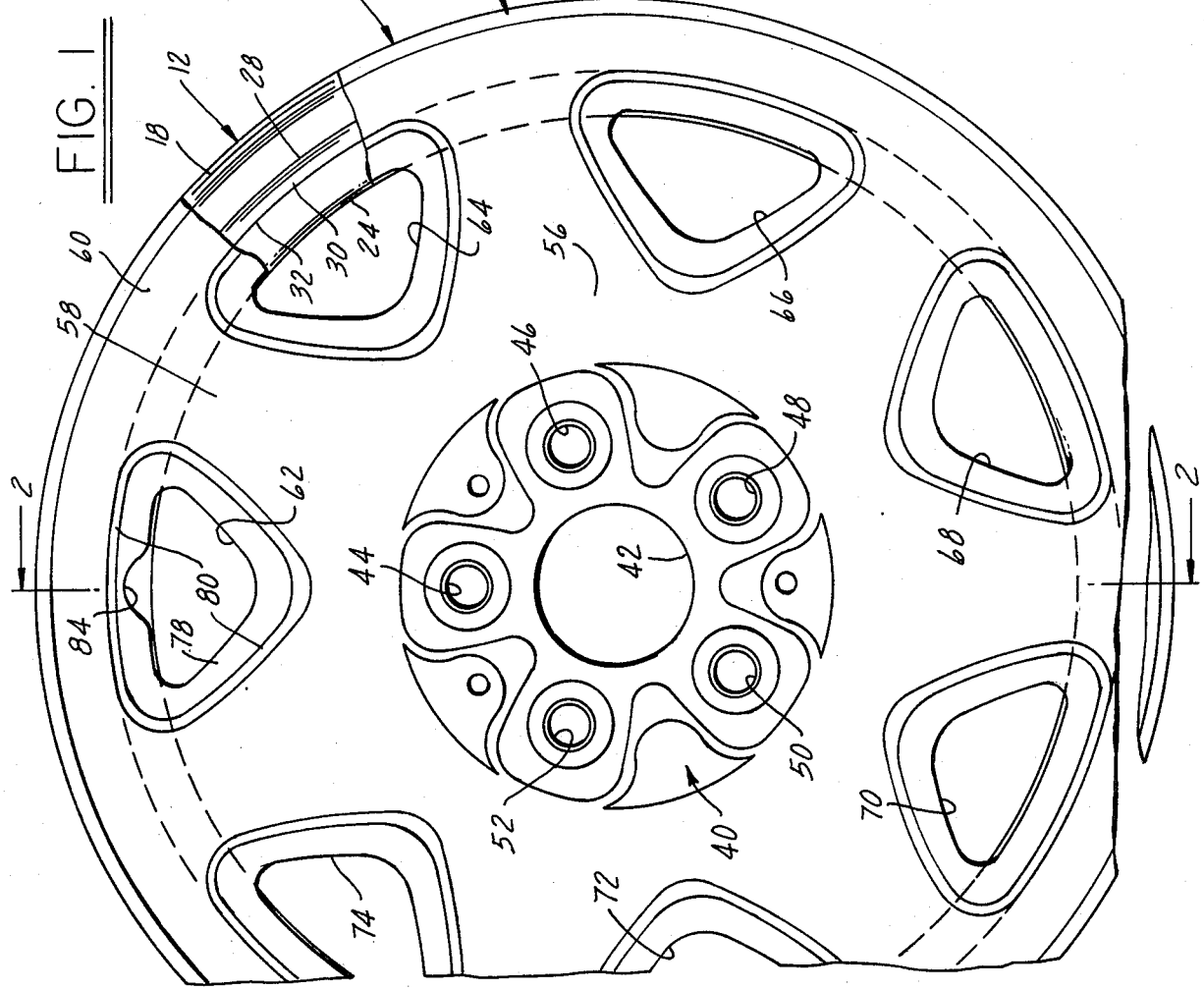

VEHICLE WHEEL WITH DISC FORMING OUTER TIRE RETAINING FLANGE

The present invention relates to vehicle wheels, and more particularly to automotive passenger vehicle wheels fabricated from sheet metal, and methods for manufacture thereof.

For well over fifty years automotive passenger vehicle wheels adapted for mounting of pneumatic tires thereon have been fabricated from sheet metal, usually steel, to provide a rolled on-piece rim with a drop-center well to which is affixed a disc or body adapted for mounting the wheel to the hub or other wheel mounting part of a vehicle. Usually the rim is made with both inboard and outboard bead seats and associated tire bead retaining flanges, and the disc is secured to the base of the drop-center well of the rim. However, so called "full-face" wheels have also been provided wherein the disc extends generally radially outwardly around its outer periphery to also form the outboard tire bead retaining flange, and the rim is formed at its outboard edge to provide the outboard bead seat and a free edge which is welded or otherwise affixed to the inboard face of the full-face disc part. Such "full-face" wheels enable the wheel designer to provide a more unique and distinct styling appearance to the outboard face of the wheel, thereby obviating the need for attaching ornamental wheel covers and their attendant problems and cost. Examples of such full-face wheels of the prior art may be found in U.S. Pat. Nos. 2,083,326; 2,016,525; and 2,057,565.

A more recent passenger car wheel development, initiated in the early 1960's by applicants' assignee herein, Mortor Wheel Corporation, is the so-called "styled" wheels wherein the disc is stamped or drawn in progressive deep-draw die operations to impart a decorative, highly contoured configuration to the disc. Although for the most part such styled wheels comprise a conventional disc and rim assembly wherein the disc is affixed to the drop-center base of a full-rim section, styled steel wheels have also been produced in "full-face" type wheels. One commercially successful prior art example if a styled full-face steel wheel is that illustrated on page 26 of the April 1965 issue of *Motor Trend* magazine. In this construction both the disc and rim parts are each made as separate stampings and then joined together by a circumferentially continuous weld at the outboard edge of the inboard rim part. Such construction requires very tight quality control of the circumferentially continuous weld since the same has to be air-tight for use with tubeless tires. The outboard full-face disc-rim part is provided with deep ribs with small-radiused corners, and requires a very high quality, deep-drawing steel.

Other prior art of interest to, but not suggestive of, the present invention is set forth in the following United States and foreign patents:

| U.S. Pat. No. | 1,589,449 | 6/1926 | Williams |
| U.S. Pat. No. | 2,608,236 | 8/1952 | Hunt |
| U.S. Pat. No. | 3,506,311 | 4/1970 | Nobach |
| France | 1,003,182 | 3/1952 | Michelin |

With the increasing popularity in automobile passenger cars of both U.S. and foreign manufacture of front wheel drive systems, wheel designs have had to be modified to provide a much greater disc "offset", i.e. the axial spacing of the disc outboard of the mid-plane of the wheel as defined by the inboard and outboard tire bead seats, to accommodate the larger disc brakes and other associated wheel hub and drive structure of front wheel drive systems. The aforementioned commercial full-face styled wheel construction is not suited to suit such front wheel drive requirements. Accordingly, much effort has gone into attempting to successfully design and manufacture a full-face styled, steel fabricated wheel which will provide both the required large disc offset and other parameters such as a highly stylized, full-face appearance, and a strong and reliable air-tight circumferential weld joint, while also being capable of meeting the severe fatigue life specifications required on current automotive passenger vehicle wheels and yet remaining cost competitive with high offset front wheels of dual flanged rim and interior press fit disc construction.

Acccordingly, it is an object of the present invention to provide an improved vehicle wheel construction and method of making the same from sheet metal which overcomes the aforementioned problems and satisfies present-day fatigue life and manufacturing cost standards and provides a full-face styled wheel which may be designed as desired to impart an aesthetically pleasing ornamental appearance on the outboard side of the wheel.

Other objects, as well as features and advantages of the present invention will become apparent from the following detailed description taken in conjunction with the accompanying drawings (which are scaled from engineering drawings), wherein:

FIG. 1 is a fragmentary elevational view of the outboard side of an exemplary, but preferred, embodiment of a vehicle wheel constructed in accordance with the present invention, a portion of the wheel being broken away to better illustrate detail;

FIG. 2 is a central, radial cross sectional view taken on the line 2—2 of FIG. 1;

Figure 3:
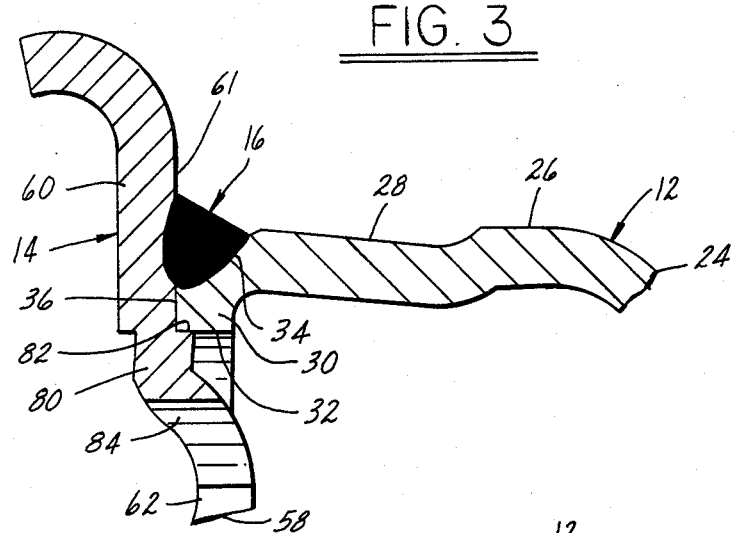
FIG. 3 is an enlargement of the portion of FIG. 2 indicated by the circle designated 3 in FIG. 2.
Figure 4:
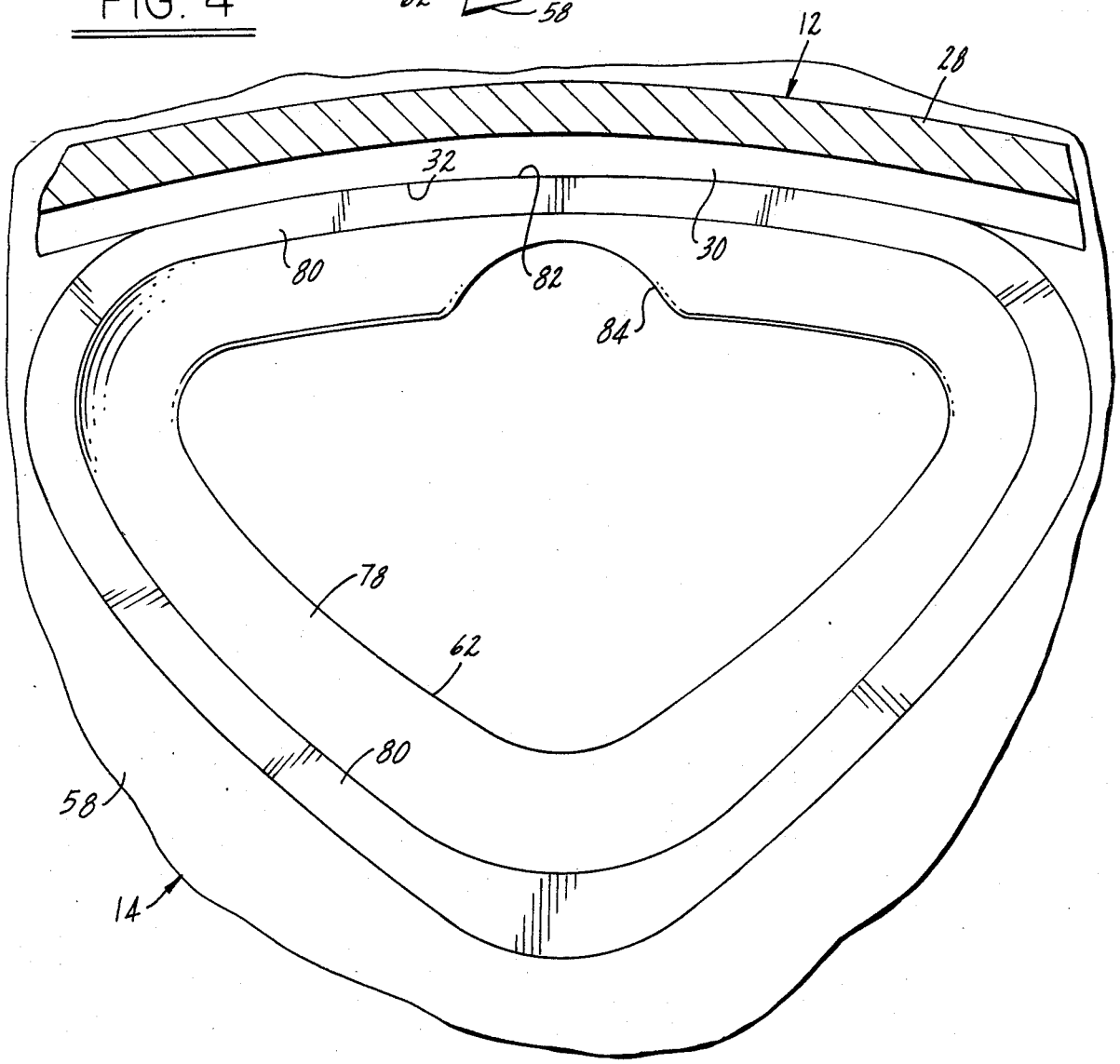
FIG. 4 is a fragmentary part sectional view taken on the line 4—4 of FIG. 2 and enlarged to the scale of FIG. 3 to better illustrate detail.

Referring in more detail to the accompanying drawings, one embodiment of a wheel 10 made in accordance with the method and construction of the present invention is shown in FIGS. 1-4. Wheel 10 comprises a two-piece assembly made up of rim 12 and a disc 14 permanently and securely joined together by a circumferentially continuous, air impermeable weld joint 16. Rim 12 is preferably made from strip steel stock by coiling, butt welding and roll forming in a conventional manner so as to provide, as best seen in FIG. 2, an inboard tire bead retaining flange 18, an inboard tire bead seat 20, a safety hump 22, a drop-center well portion 24, an outboard bead seat safety hump 26 and an outboard tire bead seat 28.

In accordance with one feature of the present invention, and as best seen in FIG. 3, the outboard free edge of rim 12 prior to wheel assembly is specially formed so as to have a radially in-turned flange portion 30 which terminates in a radially inwardly facing cylindrical surface 32. Edge portion 30 is formed by a die stamping operation to bend the initially cylindrical outboard edge of rim 12 radially inwardly, which slightly thickens the edge portion relative to the original stock thickness, after which surface 32 is machine finished to a precise diametrical dimension. Edge portion 30 is also machined to provide a slightly curved, radially inwardly sloping surface 34 which extends axially from the bead seat 29 radially inwardly in an outboard direction and terminates at a radially extending planar surface 36, likewise formed by finish machining of rim edge 30.

The disc part 14 of wheel 10 comprises a central bolt circle wheel mounting portion 40 having a pilot center opening 42 concentric with the axis of wheel 10. Wheel mounting bolt holes 44,46,48,50,52 are provided in a circular array in mounting portion 40 in the usual fashion. Disc 14 has an intermediate portion in the form of a frusto-conical hat section 54 integral with and extending radially outwardly and axially outboard from mounting portion 40 defining a crown portion 56, which in turn merges integrally with a vent opening portion 58 inclined slightly inboard of the wheel. Disc portion 58 extends radially outwardly and merges integrally with an outer peripheral portion in the form of an outboard tire bead retaining flange portion 60 which defines the outer periphery of the disc. It will thus be seen that disc 14 serves as a so-called "full-face" disc and rim part in that the disc 14 does not terminate at a junction with the well base 24 of rim 12, but rather continues beyond the rim base to provide the outboard tire bead retaining flange 60 of the rim and wheel assembly.

Disc 14 is provided with an annular array of seven vent holes 62,64,66,68,70,72,74 formed in the vent opening portion 58 of the disc. These vents holes are each individually blanked in an associated axially inboard depressed portion 78 which defines the margin of the associated vent hole 62-74. The outer periphery of portion 78 is defined by an axially inwardly or inboard offset embossment portion 80 (FIGS. 1, 2, 3 and 4). Marginal portion 80 is preferably formed in a die strike and coining operation to reduce stress cracks around the margin of the vent holes to thereby improve disc fatigue life, as is well understood in the art. As a by-product of this process of coin forming portion 80, a circumferentially extending arcuate ledge 82 (FIGS. 3 and 4) is provided along the radially outermost periphery of each vent hole margin 78. Ledges 82 are concentric with the axis of wheel 10 along the radially outermost portion of embossment 80 before it curves radially inwardly so as to surround the remaining radially inward portion of the associated vent hole. Thus, disc 14, due to the offset embossments 80 at each vent hole, has seven such ledges 82 equally spaced circumferentially around the inboard face of the disc at the same radial distance from the axis of the disc and wheel. One of the vent holes, i.e. hole 62, also has a valve stem clearance notch 84 which is aligned with a valve stem hole 86 in rim 12.

In accordance with another feature of the present invention, rim part 12 is machined so that surface 32 of the rim edge 30 has a radius only slightly greater than that of ledge 82 to provide a close fit, or preferably slightly less to provide a slight press fit, of rim edge 30 onto ledge 82 as rim 12 is axially telescoped into abutment with the inboard surface of disc 14 in a suitable assembly fixture of a welding machine. This fixturing also brings rim surface 36 into flat abutment with the radially extending inboard planar surface 61 of outboard flange 60. The seven ledges 82 thus assist in fixturing of rim part 12 to disc 14 preparatory to forming the circumferential weld 16 by positively locating rim 12 concentric with the axis of disc 14.

Once rim 12 has been so fixtured to disc 14 such that the parts assume their relative positions shown in FIGS. 2 and 3, assembly of wheel 10 is completed by permanently affixing rim 12 to disc 14 by forming a circumferentially continuous arc weld 16 in the "trench" defined between rim edge sloping surface 34 and flange surface 61, as best seen in FIG. 3. Weld 16 is preferably full penetration arc weld so as to securely join the rim and disc together and form an air-tight seal at the junction of these parts.

As a further feature of the invention, the in-turned edge 30 of rim 12 provides sufficient back-up metal for weld 16 so as to prevent weld burn-through radially inwardly of the joint despite the full penetration nature of the weld. Moreover, the in-turned rim edge 30 configuration automatically defines the sloping trench to confine the weld metal of weld joint 16 and provide space for the same so that it either does not protrude radially outwardly or above the adjacent bead seat surface 28 of rim 12, or, if it does, there is a significant reduction in the amount of weld metal which needs to be removed by a finish grinding operation to provide a smooth tire bead seating surface adjacent the outboard flange surface 61.

From the foregoing description it will now be apparent that the present invention provides a full-face styled wheel of fabricated sheet steel construction which amply fulfills the aforestated objects and offers many advantages, including those set forth above. Wheel 10, when constructed as described above, has been found to have greatly improved fatigue life without increasing the cost of manufacture or difficulty of assembly. These improved results are believed to derive from several cooperative features of the foregoing wheel construction design. The radially in-turned edge portion 30 of the rim in and of itself increases the hoop strength at the free edge of the rim as well as contributing to improved reliability, air impermeability and strength of the full penetration weld joint 16. Rim edge 30, by preventing weld burn-through, also lessens manufacturing costs by reducing defective assemblies and thus scrap loss. The trench at the disc-rim junction reduces or eliminates weld grinding finish operations. Seating of the rim edge 30 on ledges 82 assists in accurate fixturing by positively locating the rim on the disc for the welding operation. These seven equally angularly spaced ledges also provide mechanical support for the outboard rim edge against radially inwardly directed service loading, thereby reducing shear stress loads on the weld joint. Moreover, these advantages are obtained in a full-face wheel construction so that aesthetic styling contours are now obtainable in a wheel which also can meet O.E.M. passenger car service and fatigue life testing requirements, and, at the same time, provide a large disc "offset" dimensional relationship to accommodate front wheel drive systems. It will, of course, be understood that other configurations may be imparted to disc 14 to vary the ornamental appearance thereof in accordance with a variety of styled steel wheel designs by retaining the characteristic features and advantages of the invention as described above.

We claim:

1. In an automotive passenger vehicle wheel construction having a disc fabricated from sheet metal and including a central bolt circle mounting portion, an intermediate portion extending generally radially outwardly from said bolt circle mounting portion and an outer peripheral portion surrounding said intermediate portion, said disc outer peripheral portion being formed to provide an outboard tire bead retaining flange for said wheel, and a rim part including an inboard tire bead retaining flange, an inboard tire bead seat portion, a drop-center well portion and an outboard bead seat portion, the improvement wherein the outboard edge of said rim part comprises a radially in-turned rim edge flange portion extending circumferentially continuously around the rim edge adjacent said rim outboard bead set, said rim edge flange having a radially extending abutment surface at the outboard extremity thereof, said disc outboard flange having a radially extending rim mating surface disposed in abutment with said rim edge abutment surface, said rim edge flange having a radially inwardly sloping surface extending between said rim outboard bead seat and said rim edge abutment surface and defining with said disc outboard flange a trench disposed radially inwardly of said rim outboard bead seat, said rim and disc parts being permanently joined by a circumferentially continuous weld formed in said trench.

2. The wheel as set forth in claim 1 wherein said disc is provided with a ledge means on the inboard face thereof having a radially outwardly facing surface means concentric with the axis of the wheel, and said outboard rim edge flange portion has a radially inwardly facing cylindrical surface contacting said ledge means in axially telescoped relationship therewith to thereby locate said rim on said disc and to help support said rim on said disc against radially inwardly directed service loading imposed on said rim.

3. The wheel as set forth in claim 2 wherein said disc has an annular array of vent holes disposed in said intermediate section and axially inboard offset marginal portions individually surrounding each of said vent holes, said marginal offset portions along the radially outermost portions thereof providing a series of circumferentially spaced surfaces collectively defining said disc ledge means.

4. The wheel as set forth in claim 3 wherein said vent hole offset marginal portions are produced by a coining operation to reinforce said disc against stress fatigue in the vicinity of each said vent hole.

5. The method of making a wheel as set forth in claim 3 comprising the steps of coining in said disc prior to assembly with said rim said vent hole offset marginal portions to reinforce said disc against stress fatigue in the vicinity of each said vent hole, and then axially telescoping said rim onto said disc ledge prior to forming said weld.

6. The method of making a wheel as set forth in claim 5 wherein said weld joint is made by arc welding a flare bevel full-penetration weld with the outer surface of said weld being generally flush with the adjacent surface of said rim outboard bead seat surface.

7. The method of making a wheel as set forth in claim 6 comprising the further steps of machining said rim outboard edge flange portion to provide said radially extending abutment surface, machining said rim edge flange portion to provide said rim edge flange sloping surface and then juxtaposing the same in flat face abutment with said radially extending surface of said disc outboard flange to define the end limit of the axially telescoped rim and disc prior to forming said weld.

8. The method of making a wheel as set forth in claim 7 wherein said rim outboard edge flange portion is machined to have a press fit in axially overlapping assembled relationship with said ledge means on said disc.

9. The method of making a wheel as set forth in claim 8 comprising the steps of roll forming said rim from sheet steel and stamping said disc from sheet steel prior to assembly of the same into said wheel.

10. The wheel as set forth in claim 2 wherein said rim outboard edge flange portion is dimensioned to have a press fit in axially overlapping assembled relationship with said ledge means of said disc.

11. The wheel as set forth in claim 10 wherein said rim is roll formed from sheet steel and said disc is fabricated in stamping operations from sheet steel.

12. The wheel as set forth in claim 1 wherein said weld joint comprises a flare bevel full-penetration weld with the outer surface of said weld being generally flush with the adjacent surface of said rim outboard bead seat surface.

13. The wheel as set forth in claim 12 wherein said rim outboard edge flange portion is machined to provide said radially extending abutment surface in flat face abutment with said radially extending surface of said disc outboard flange, said rim edge flange portion is also machined to provide said rim edge flange sloping surface, and wherein said rim outboard edge flange portion is slightly thicker relative to the original stock thickness of the rim by being bent in a die stamping operation from an initially cylindrical outboard edge portion of said rim radially inwardly of the rim.

14. The wheel as set forth in claim 1 wherein said rim outboard edge flange portion is machined to provide said radially extending abutment surface in flat face abutment with said radially extending surface of said disc outboard flange, and said rim edge flange portion is also machined to provide said rim edge flange sloping surface.

15. The method of making a wheel as set forth in claim 14 wherein said rim outboard edge flange portion is formed by a die stamping operation to bend an initially cylindrical outboard edge portion of said rim radially inwardly of said rim to thereby slightly thicken said edge portion relative to the original stock thickness of said rim, and thereafter machining said rim outboard flange portion to form said surfaces.

16. The wheel as set forth in claim 14 wherein said rim outboard edge flange portion is slightly thicker relative to the original stock thickness of the rim by being bent in a die stamping operation from an initially cylindrical outboard edge portion of said rim radially inwardly of the rim.

* * * * *